United States Patent [19]
Sekizawa et al.

[11] Patent Number: 5,278,641
[45] Date of Patent: Jan. 11, 1994

[54] BRIGHTNESS REFERENCED COLOR IMAGE CORRECTING APPARATUS

[75] Inventors: Hidekazu Sekizawa, Yokohama; Naofumi Yamamoto, Inagi; Haruko Kawakami, Funabashi; Tutomu Saito, Yokohama, all of Japan

[73] Assignee: Kabushiki Kaisha Toshiba, Kawasaki, Japan

[21] Appl. No.: 664,726

[22] Filed: Mar. 5, 1991

[30] Foreign Application Priority Data

May 14, 1990 [JP] Japan .................. 2-123522

[51] Int. Cl.$^5$ .............................................. H04N 1/46
[52] U.S. Cl. ..................... 358/527; 358/500; 382/51
[58] Field of Search ............. 358/75, 76, 80, 464; 382/51

[56] References Cited

U.S. PATENT DOCUMENTS

| | | | |
|---|---|---|---|
| 4,649,423 | 3/1987 | Hoffrichter et al. | 358/80 |
| 4,736,245 | 4/1988 | Seto et al. | 358/76 |
| 4,812,903 | 3/1989 | Wagonsonner et al. | 358/75 |
| 4,975,768 | 12/1990 | Takaraga | 358/75 |

FOREIGN PATENT DOCUMENTS 0369720 11/1989 European Pat. Off.
63-124665 1/1987 Japan.

OTHER PUBLICATIONS

"Automatic Image Brightness Scaling", IBM Technical Disclosure Bulletin, vol. 28, No. 3, Aug. 1985, pp. 1250-1252.

Shinohara, S. et al., "Human Face Detection From Negative Color Film and Its Color Correction", Proceeding of the Joint Conference On Image Technology pp. 151, 1987.

*Primary Examiner*—Edward L. Coles, Sr.
*Assistant Examiner*—Jill Jackson
*Attorney, Agent, or Firm*—Finnegan, Henderson Farabow, Garrett & Dunner

[57] ABSTRACT

A color image processing system which reads or receives a color image and outputs corrected color image to a display or printer. The system estimates the brightness of the original image and executes correction on the basis of this estimation. The system uses histograms to determine correction.

7 Claims, 8 Drawing Sheets

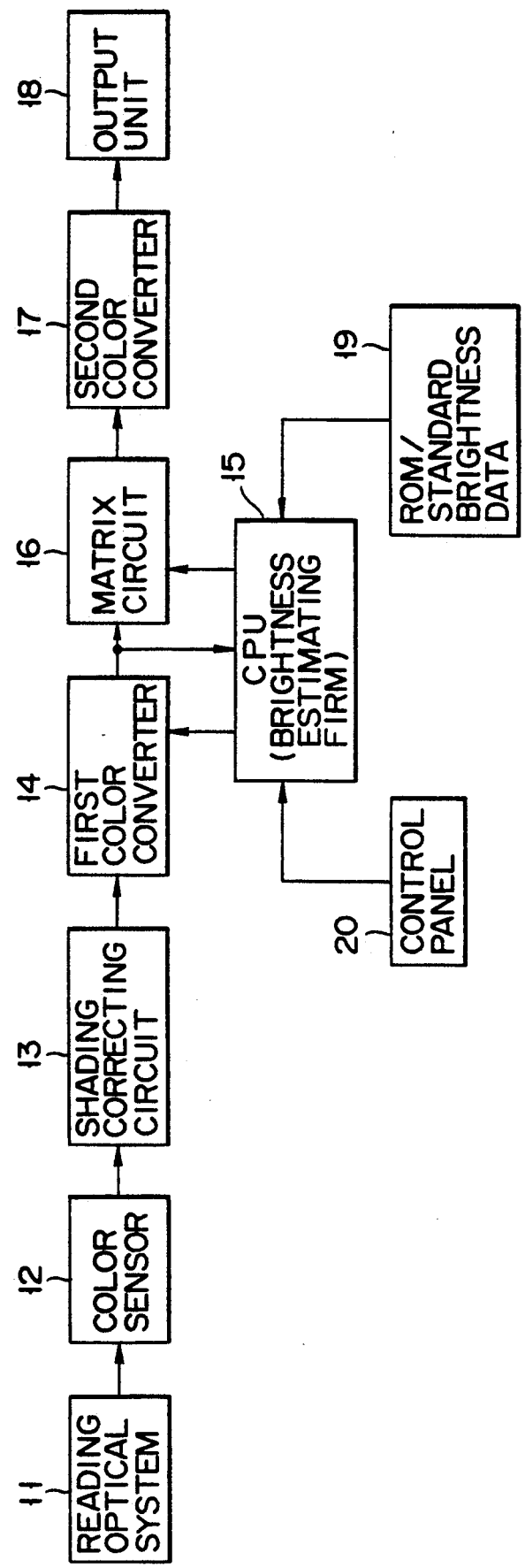
F I G. 1

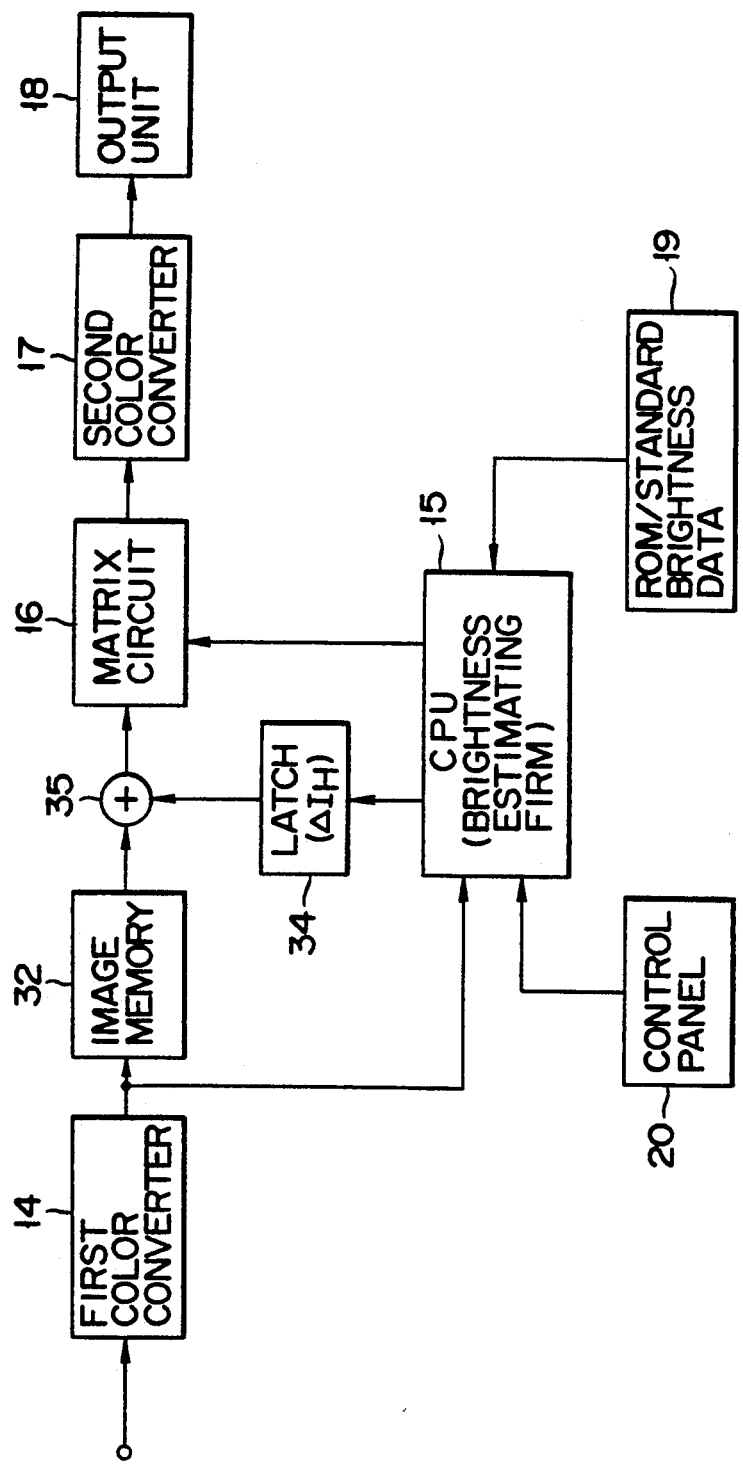
F I G. 10

BRIGHTNESS REFERENCED COLOR IMAGE CORRECTING APPARATUS

BACKGROUND OF THE INVENTION

1. Field of Invention

The present invention relates to a color image processing apparatus for processing an image signal obtained by reading a color image or a transmitted image signal and outputting the processed image signal to a printer or a display and, more particularly, to a color image processing apparatus having a function of correcting a color image signal obtained by reading a color image signal photographed by a camera using a silver halide film or a color image signal read by a reading apparatus, a brightness reference of which is unknown, by estimating the brightness of an original image.

2. Description of Related Art

In general, when an original color image is to be reproduced by an output apparatus such as a color printer or a color display from a color image signal obtained by reading a color image, photographed by a camera using a negative or positive color film, by using an image sensor or a color image signal obtained by photographing performed by an electronic camera, the reproducibility of the color image is significantly reduced if the brightness of a photographing state is inadequate. This is mainly because the dynamic range in gradation of an output apparatus is narrower than those of a photographing system and a reading system. For example, if an original image is dark, a dark color portion may not be reproduced because it becomes continuous. On the other hand, if an original image is too bright, a light color portion may not be reproduced because it is whitened.

Similarly, when an original color image is to be reproduced from a color image signal read by a reading apparatus having an unknown brightness reference or a transmitted color image signal, the reproducibility is reduced unless the white reference level of the reading apparatus coincides with that of an output apparatus.

To avoid the above inconvenience, the brightness of an original color image is estimated from an input color image signal, and the color image signal is corrected on the basis of the estimated brightness. As this correction method, a method called an averaging method or an equivalent neutral density method is known. This method is based on the statistical fact that the total sum of the color densities of an entire color image to be reproduced is close to neutral gray. In this method, therefore, an average value of the color densities of an entire image is calculated, and a brightness is estimated from this average value, thereby executing correction. In this method, however, if an original image is in a color deviated from gray, it is difficult to correctly estimate the brightness. In addition, since the total sum of the color densities of an entire image is calculated, a brightness cannot be estimated unless a color image signal of an entire image is input. Therefore, to correct color image signals transmitted at a predetermined rate, a large-capacity memory is required to temporarily store color image signals of an entire image, and response characteristics are degraded.

Published Unexamined Japanese Patent Application No. 63-131777 describes a method in which a maximum value of one (e.g., an R signal) of color image signals (generally, three primary color signals R, G, and B) or a signal corresponding to a luminance is calculated and compared with a predetermined reference value to obtain a difference, thereby generating brightness information on the basis of this difference. Also in this method, however, if a large amount of colors (e.g., a scene of lawn constituted by green) deviated from gray is included in an original color image, it is difficult to correctly estimate the brightness.

SUMMARY OF THE INVENTION

It is an object of the present invention to provide a color image processing apparatus capable of correctly estimating the brightness of an original image and properly executing correction on the basis of the estimation even if the original image is constituted by deviated colors, and capable of estimating a brightness from an image signal indicating only a part of an image.

In order to solve the above problem, the present invention is characterized in that a color image signal obtained by reading a color image or a transmitted color image signal is converted into a first signal which is influenced more easily by the brightness of an original image and second and third signals which are influenced less easily by the brightness of the original image, the value of the first signal in a predetermined local region on a plane (chromaticity plane) formed by the second and third signals is compared with a predetermined standard value, the brightness of the original image is estimated on the basis of the comparison to generate brightness information, and the color image signal is corrected in accordance with the brightness information.

More specifically, when a color image signal is constituted by three primary color signals, these signals are logarithmically transformed first and then converted into a luminance signal as the first signal and two color difference signals as the second and third signals. That is, although a read color image signal is expressed as a product of gradation information of an original image and brightness information of a light source, a logarithmically transformed color image signal is expressed as a sum of the gradation information of the original image and the brightness information of the light source. Therefore, when a color difference signal between the three primary color signals logarithmically transformed into log density signals is calculated, an influence of the brightness of the light source commonly included in the primary color signals upon photographing or reading is removed. In place of calculation of a color difference executed after the logarithmic transformation, a ratio calculation between the primary color signals may be performed to remove the brightness information of the light source.

In this case, the brightness estimation is basically executed by comparing the luminance in a predetermined local region on a color difference plane formed by the axes of the two color difference signals with a predetermined standard luminance. For example, the color difference plane is divided into a plurality of regions (to be referred to as blocks hereinafter) in accordance with the values of the color difference signals, and a luminance signal obtained together with the color difference signals is processed in each block to form a histogram about a specific luminance of the block. A luminance at a highest frequency in the histogram is compared with the standard luminance to generate brightness information, and the brightness information of each block is averaged using the highest frequency as a weight.

The brightness correction is executed for the logarithmically transformed three primary color signals in accordance with the brightness information obtained by the brightness estimation.

According to the present invention as described above, while an influence of the brightness of a light source is removed, a signal value which changes in accordance with the brightness of the light source, e.g., a luminance is compared with a standard luminance as a standard value to execute brightness estimation, and brightness correction is executed on the basis of the brightness estimation results.

In addition, since the bright information is generated on the basis of the comparison between the luminance in a local region on the color difference plane and the standard luminance, even if an original image is constituted by deviated colors, brightness estimation can be correctly executed without being influenced by brightness differences between the colors. For this reason, a brightness can be estimated with a certain degree of precision from information about only a part of an image.

Furthermore, since the color difference plane is divided into a plurality of blocks and the brightness information of each block obtained by using the luminance histogram is averaged using the highest frequency on the histogram as a weight, the brightness estimation can be executed more stably.

BRIEF DESCRIPTION OF THE DRAWINGS

FIG. 1 is a block diagram showing the first embodiment of the present invention;

FIGS. 8, 9, and 10 are block diagrams showing the second, third, and fourth embodiments of the present invention, respectively.

DETAILED DESCRIPTION OF THE PREFERRED EMBODIMENTS

Embodiments of the present invention will be described below with reference to the accompanying drawings.

Figure 2:
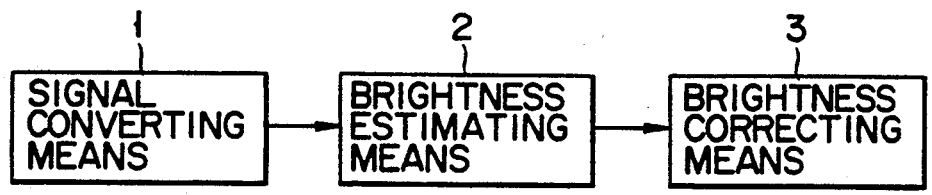
FIG. 2 is a functional block diagram of a main part showing a schematic arrangement of the present invention.

FIG. 2 is a functional block diagram schematically showing a basic arrangement of a color image processing apparatus according to the present invention. This color image processing apparatus comprises signal converting means 1 for converting a color image signal into a first signal (e.g., a luminance signal) which is influenced more easily by the brightness of an image signal and second and third signals (e.g., color difference signals) which are influenced less easily by the brightness of the original image, brightness estimating means 2 for comparing the value of the first signal in a predetermined local region on a plane formed by the second and third signals with a predetermined standard value to generate brightness information about the original image, and brightness correcting means 3 for correcting the color image signal in accordance with the brightness information.

FIG. 1 is a block diagram showing an arrangement of an embodiment in which the above color image processing apparatus of the present invention is applied to a film input/processing apparatus. That is, in this apparatus, a color image on a photographed color film is read by a color sensor, the brightness upon photographing is estimated from the obtained color image signal to execute brightness correction for the signal, and the corrected signal is output from a color printer or the like. In this case, the brightness corresponds to an exposure state during the photographing. When the exposure state is inadequate or when a color image is read on a film by simply using a light source having a constant light amount even if the exposure state is adequate, a reproduced output image may be too bright or too dark. The apparatus of this embodiment corrects this inconvenience.

Referring to FIG. 1, a photographed color film is set on a reading optical system 11. A color image on the film projected by the reading optical system 11 is read by a color sensor 12 constituted by, e.g., a CCD image sensor, and a color signal Si is output as a color image signal. In this case, "i" represents the colors of color filters used in the color sensor 12, e.g., three types of R (red), G (green), and B (blue). That is, in this embodiment, the color signal Si as the color image signal is obtained as three primary color signals.

An operation of this apparatus is executed by two steps of a brightness estimation operation and a brightness correction operation. During the brightness estimation operation, reading of a color image on a color film is executed at a high speed. Unlike in normal image reading, sampling is performed in a subscanning direction, and the color signal Si is output from the color sensor 12. The color signal Si is subjected to normalization performed by a shading correcting circuit 13, i.e., subjected to correction of a sensitivity variation of the color sensor 12 or an illuminance variation on a color film to be read caused by the reading optical system 11. The color signal corrected by the shading correcting circuit 13 is normalized such that a signal level corresponding to a state in which a film image is removed (i.e., corresponding to the brightness of a light source) is "1" and a signal level corresponding to an OFF state of the light source is "0". The color signal Si output from the shading correcting circuit 13 is input to a first color converter 14.

The first color converter 14 is constituted using, e.g., a RAM (Random Access Memory) table and executes logarithmic transformation given by the following equation (1) for the color signal Si to obtain a color signal Di:

$$Di = -\log[(Si/Sbi) + \alpha] \quad (1)$$

where Sbi is the signal value corresponding to a film base. By dividing Si by this value Sbi, a signal component corresponding to the base color of a film is removed. $\alpha$ is the logarithmic transformation result which is a value for preventing Di from being infinite. Note that although the value of Sbi may be substantially "1" when a color film to be read is a positive film, it is preferably changed for higher precision. Therefore, even when a positive film is used, the base color of the film is preferably measured to execute correction. More specifically, a CPU 15 calculates $-\log[(x/Sbi) + \alpha]$ (where x is the input variable) and supplies the calculation result to the first color converter 14.

The color signal Di output from the first color converter 14 is supplied to the CPU 15 serving as a brightness estimation firm upon brightness estimation operation. On the basis of the value of the color signal Di of the entire image, the brightness of the color image on the color film, i.e., exposure conditions of the input color film upon photographing are estimated. This brightness estimation will be described in more detail later.

The brightness information obtained by the CPU 15 in accordance with the brightness estimation is used in rewriting of the RAM table in the first color converter 14 and rewriting of a matrix coefficient in a matrix circuit 16, thereby executing brightness correction.

An operation of actually executing the brightness correction to obtain an image on a color film as a color hard copy will be described below. Also in this case, an image on a color film projected by the optical system 11 is read by the color sensor 12. However, unlike in the brightness estimation operation, a color signal Si is output without performing sampling. This color signal Si is supplied to the shading correcting circuit 13 and the first color converter 14 and logarithmically transformed into a color signal Di. The color signal Di is output to the matrix circuit 16. The matrix coefficient in the matrix circuit 16 is rewritten into a proper value beforehand in accordance with the brightness estimation operation. The matrix circuit 16 outputs color signals corresponding to the densities of inks of the respective colors. "j" represents colors of inks used in an output unit 18, e.g., Y (yellow), M (magenta), and C (cyan). A relationship between the ink color signal Qj (j=Y, M, and C) and the color signal Di (i=R, G, and B) is given by the following equation (2):

$$Qj = \sum_i Mji \cdot Di \quad (2)$$

Mji represents a 3×3 masking matrix. The color signal Qj output from the matrix circuit 16 is supplied to a second color converter 17, and an ink amount signal Pj corresponding to an ink amount to be supplied to the output unit 18 is obtained. A relationship between Qj and Pj is given by the following equation (3):

$$Pj = (1 - T^{Qj})/(1 - T) \quad (3)$$

where T is a constant. The ink amount signal Pj is supplied to the output unit 18. Note that the function of the second color converter 17 is determined in accordance with the output unit 18, and the relationship given by equation (3) is obtained by taking thermal transfer recording as an example. In this case, the constant T is preferably about 0.01. The output unit 18 need not be of a thermal transfer recording type but may be of another recording type such as an electrophotographic type or an ink-jet recording type.

Figure 3:
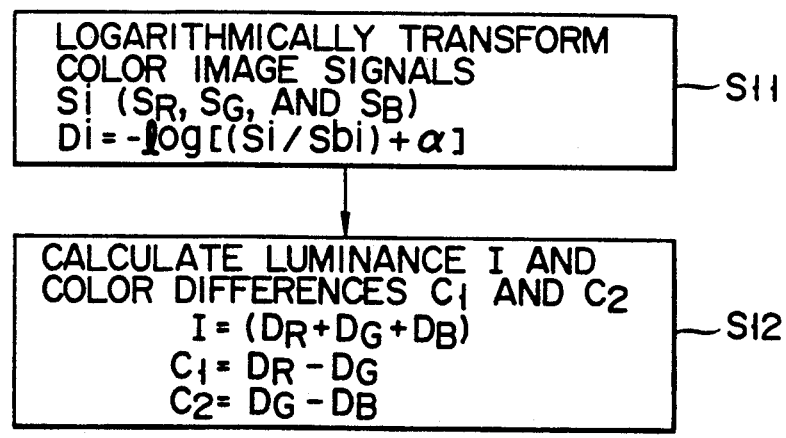
FIGS. 3, 4, and 5 are flow charts showing procedures of the same embodiment.
Figure 4:
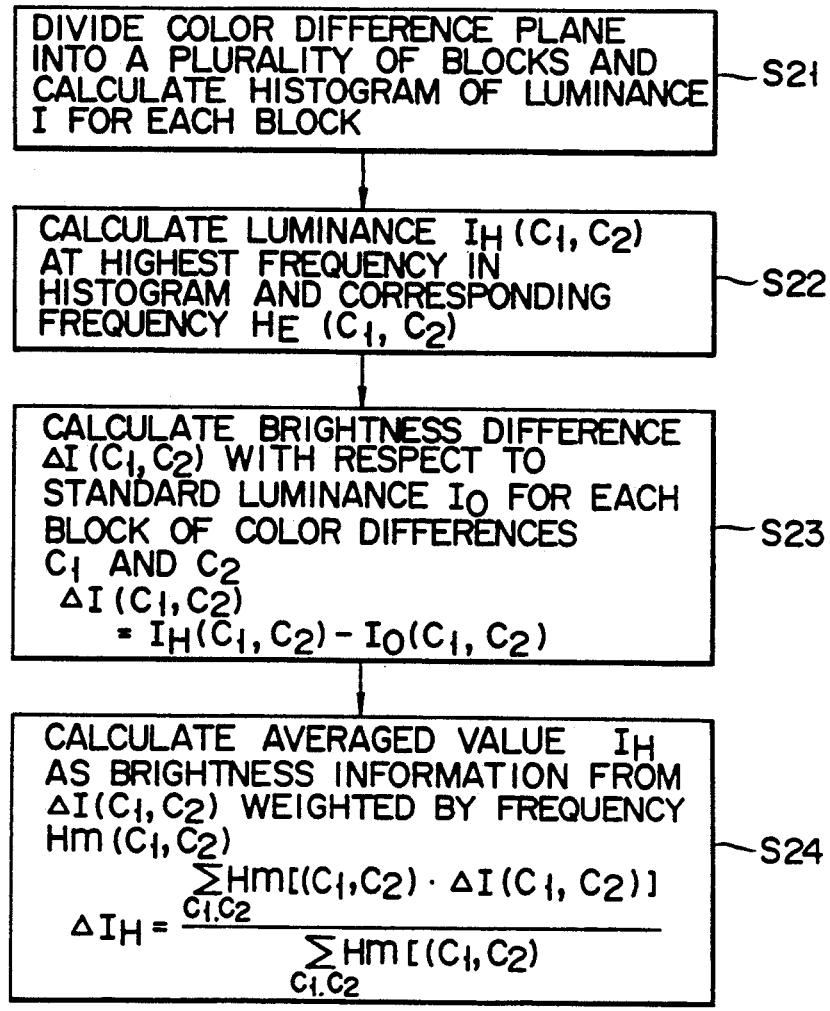
Figure 5:
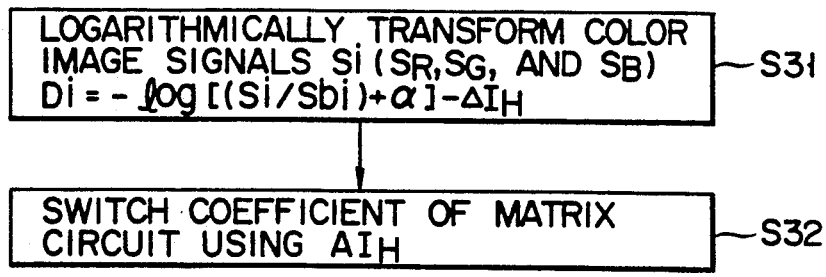

Procedures of signal conversion—brightness estimation—brightness correction of a color image signal according to the above embodiment will be described below with reference to FIGS. 3 to 5. FIGS. 3, 4, and 5 show processing flows corresponding to the signal converting means 1, the brightness estimating means 2, and the brightness correcting means 3 shown in FIG. 2, respectively. More specifically, FIGS. 3 to 5 show processing executed by the first color converter 14 and the matrix circuit 16 and processing executed by the CPU 15.

First, before the brightness estimation operation is performed, the color signal Si output from the shading correcting circuit 13 is supplied to the first color converter 14 and logarithmically transformed into the color signal Di in accordance with equation (1), and the color signal Di is supplied to the CPU 15 (S11 in FIG. 3). The CPU 15 calculates a luminance I and color differences $C_1$ and $C_2$ from the color signal Di in accordance with the following equations (4) (S12 in FIG. 3):

$$I = (D_R + D_G + D_B)/3$$

$$C_1 = D_R - D_G$$

$$C_2 = D_G - D_B \quad (4)$$

This operation may be executed by using the following equations (5) instead of equations (4):

$$I = \frac{(i_1 D_R + i_2 D_G + i_3 D_B)}{(i_1 + i_2 + i_3)}$$

$$C_1 = a_1 D_R - a_2 D_G$$

$$C_2 = b_1 D_G - b_2 D_B \quad (5)$$

In equations (5), coefficients $i_1$, $i_2$, and $i_3$ are included to match the luminance I with a visual sensitivity, thereby reducing an influence of an estimation error. When an original image is recorded on a film, the axes of the color differences $C_1$ and $C_2$ sometimes do not coincide with an achromatic color. In this case, coefficients $a_1$, $a_2$, $b_1$, and $b_2$ are used to cause the achromatic color axis to coincide with the above axes, thereby increasing an estimation precision.

Subsequently, as shown in FIG. 4, a color difference plane formed by the color differences $C_1$ and $C_2$ is divided into a plurality of blocks in accordance with the values of the color differences $C_1$ and $C_2$, and a histogram about the luminance I, i.e., a histogram indicating a relationship between a luminance and a frequency is formed for each block (S21). In accordance with this histogram, a luminance $I_H$ at a highest luminance and a corresponding frequency $H_m$ are obtained for each block (S22). Subsequently, a predetermined standard luminance $I_O$ (standard brightness data) of each block corresponding to proper brightness (proper exposure) is read out from a ROM 19 and is compared with the luminance $I_H$ at the highest frequency of the block, thereby obtaining a difference $\Delta I$ (S23):

$$\Delta I(C_1, C_2) = I_H(C_1, C_2) - I_O(C_1, C_2) \quad (6)$$

Subsequently, an average value $\Delta I_H$ is calculated by the following equation from the luminance difference $\Delta I$ in each block on the color difference plane obtained in S23 by using the highest frequency $H_m(C_1, C_2)$ obtained in S24 as a weight (S24):

$$\Delta I_H = \frac{\sum_{C_1, C_2} H_m[(C_1, C_2) \cdot \Delta I(C_1, C_2)]}{\sum_{C_1, C_2} H_m(C_1, C_2)} \quad (7)$$

Note that the average value $\Delta I_H$ represents a shift from a proper brightness (proper exposure) of the entire frame of the film.

Subsequently, on the basis of the brightness (exposure conditions) upon photographing estimated by the above operation, the RAM table of the first converter 14 and the masking matrix coefficient of the matrix circuit 16 are switched to execute brightness correction. That is, as shown in FIG. 5, the CPU 15 calculates $-\log[(x/Sbi)+\alpha]-\Delta I_H$ and returns the calculation result to the first converter 14 to rewrite the contents in the RAM table. As a result, the conversion characteristic (function) of the first color converter 14 is changed from equation (1) to the following equation (7), and logarithmic transformation is executed in accordance with this equation (7) (S31):

$$Di = -\log[(Si/Sbi)+\alpha]-\Delta I_H \quad (8)$$

When a brightness (exposure conditions) during photographing is shifted by about twice or about ½ from a proper value, no preferable color reproduction can be obtained simply by correcting the brightness. In this case, therefore, the matrix coefficient of the matrix circuit 16 is switched (S32). For example, when a negative film is used and a brightness (exposure conditions) is shifted by about ½ from a proper value, a coefficient (experimental value) about 1.4 times the proper masking matrix coefficient may be used to obtain an image with a high contrast. When the brightness (exposure conditions) during photographing is shifted by about twice from the proper value, a coefficient (experimental value) about 0.94 times the proper masking matrix coefficient may be used to realize more precise color reproduction.

Figure 6A:
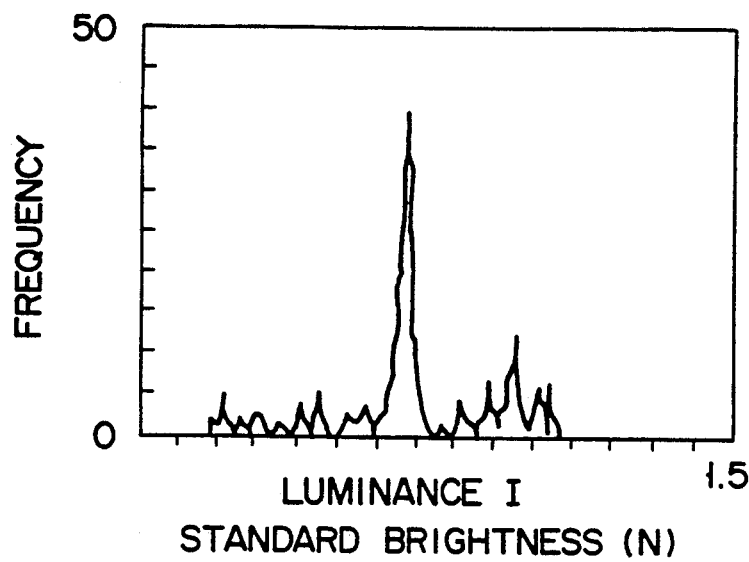
FIGS. 6A and 6B are views showing examples of histograms in the same embodiment.
Figure 6B:
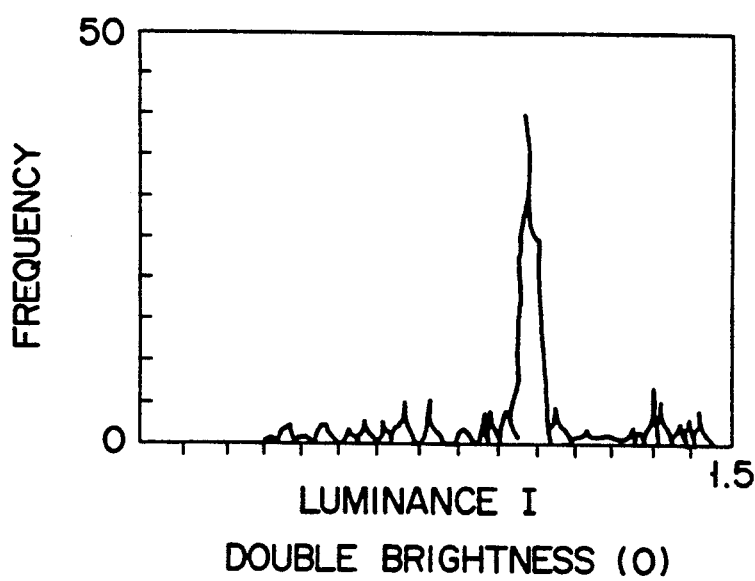

FIGS. 6(a) and b(b) show examples of histograms. In particular, FIG. 6 (a) indicates a histogram corresponding to a standard brightness, and (b) indicates that corresponding to a brightness twice the standard brightness. As is apparent from these figures, $\Delta I_H$ changes by about 0.3 on the log scale.

Figure 7A:
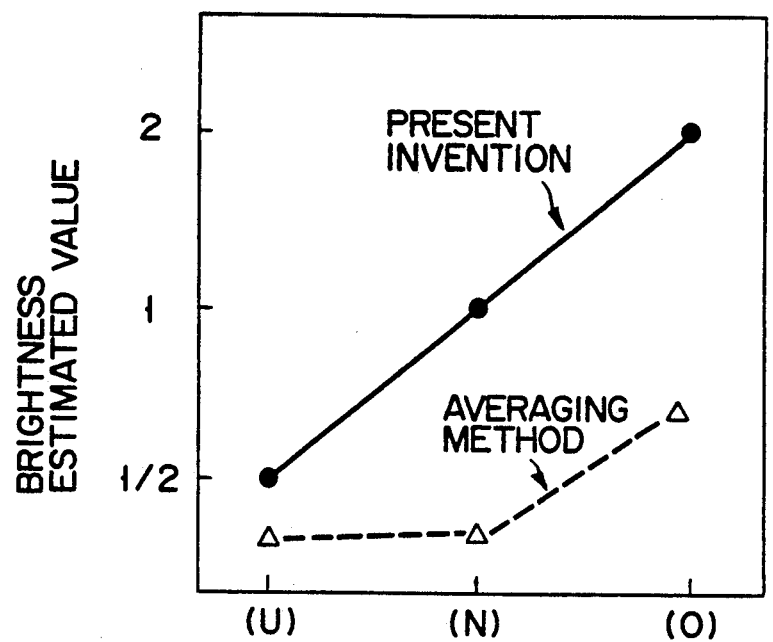
FIGS. 7A and 7B are views showing examples of estimation results according to the same embodiment.
Figure 7B:
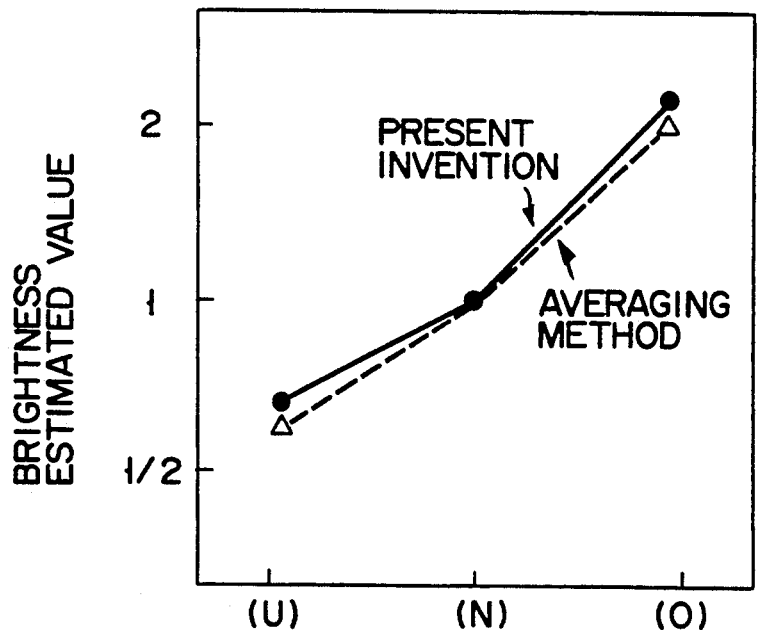

FIGS. 7(a) and 7(b) show examples of the brightness estimation results. On the abscissa indicating the brightness in these figures, (N) represents a standard brightness; (O), a brightness twice the standard brightness; and (U), a brightness ½ the standard brightness. FIG. 7(a) shows results obtained when an original image has a large green area. As is apparent from FIG. 7(a), while estimated values obtained by a conventional averaging method (equivalent neutral density method) are largely shifted, brightness estimation can be executed very correctly according to the present invention. FIG. 7(b) shows results obtained when an original image is a test chart in which various types of colors are present. When such an image is used, almost no difference is found between brightness estimated values obtained by the averaging method and the present invention.

The above embodiment has been described without referring to a difference between negative and positive films. In an actual system, however, the function of the first color converter 14 and the masking matrix coefficient of the matrix circuit 16 must be changed in accordance with whether the film is a negative or positive film. In an actual operation, information indicating either negative or positive selected by a control panel 20 shown in FIG. 1 is input to the CPU 15. Thereafter, brightness information obtained by the above-mentioned operation is input to be CPU 15. On the basis of these pieces information, the function of the first color converter 14 and the masking matrix coefficient of the matrix circuit 16 are set to be proper values.

In the above embodiment, the present invention is applied to a film input/processing apparatus. However, the same concept can be applied to a case where a color photograph on normal print paper is to be read by a color sensor via a reflecting reading optical system. In this case, if an entire frame is constituted by a single color photograph, this frame can be processed by a single parameter. If, however, a plurality of photographs are adhered on an original, dark and bright photographs may be present at the same time. In this case, as in the above embodiment, histograms are obtained for the individual photographs to determine the parameters of the respective photographs, and the photographs are processed using these different parameters. However, an operation of switching tables in the first color converter 14 for the individual photographs is cumbersome. To avoid this inconvenience, the table in the first color converter 14 is fixed, and a circuit for adding a brightness shift amount $\Delta I_H$ to an output from the first color converter 14 is additionally provided, thereby instantaneously executing brightness correction to perform proper brightness correction for each photograph. As a method of dividing photographs, density histograms (especially white-level histograms) may be formed by performing projection in the vertical and horizontal directions during the brightness estimation operation, thereby dividing photographs on the basis of these pieces of histogram information.

Figure 8:
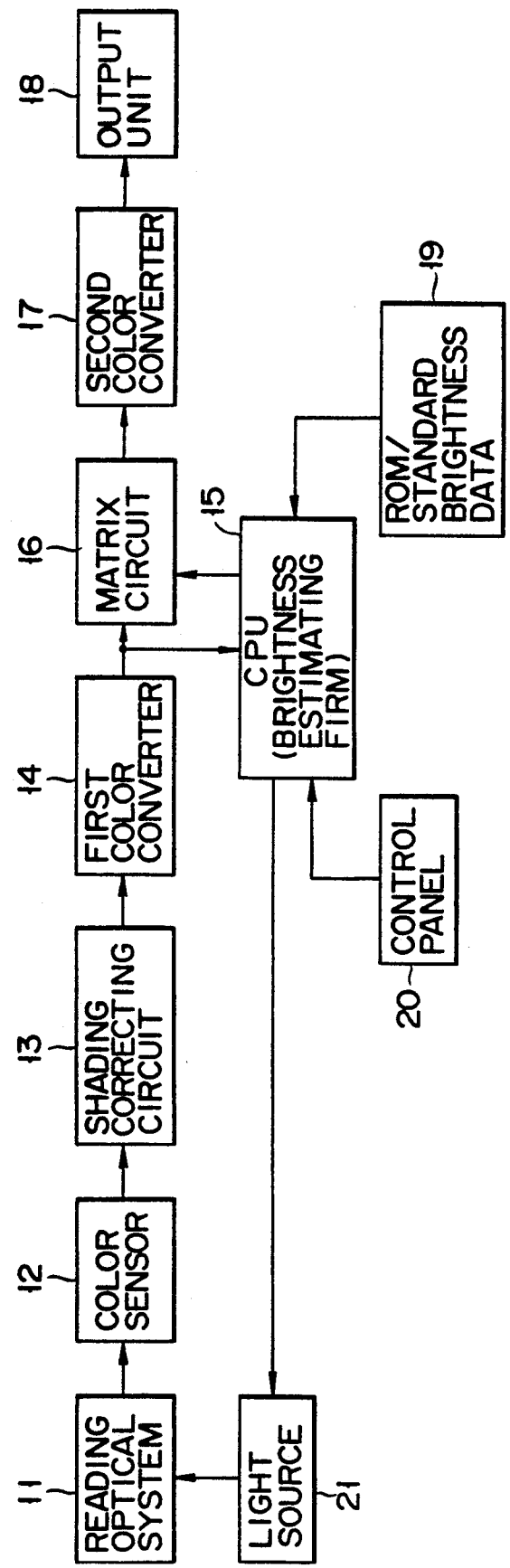

Another embodiment of the present invention will be described below. FIG. 8 is a block diagram showing the second embodiment of the present invention. The second embodiment is different from the first embodiment in that a light source 21 is arranged independently from the reading optical system 11 shown in FIG. 1 so as to be controlled by a CPU 15 to perform brightness correction.

In this embodiment, as in the above embodiment, data as a reference required for shading correction is input, and a color film is set on a reading optical system 11. As in the first embodiment, this data is read by a color sensor 12, corrected by a shading circuit 13, and converted by a first color converter 14 into a color signal Di, and the color signal Di is input to the CPU 15 to perform brightness estimation. The brightness of the light source 21 is multiplied by $10^{-\Delta I_H/\beta}$ in accordance with the brightness estimated value $\Delta I_H$ estimated by the CPU 15. Note that this $\beta$ is strictly a value depending on a color film to be read. Setting of the coefficient of the matrix circuit 16 is executed in the same manner as in the above embodiment. The brightness correction can also be executed by controlling the light source 21 as described above. In this embodiment, since an image can be read by the color sensor 12 at an optimal brightness by controlling the light amount of the light source 21, quantization noise in a color image signal obtained upon reading can be reduced.

In each of the above two embodiments, an image recorded on a color film is read to obtain a color image signal, and this color image signal is processed. However, the brightness estimating system of the present invention can be applied to a color image signal which is transmitted in image communication or in a television conference or a TV telephone system, or a color image signal which is recorded in a medium such as a floppy disk or an optical disk and in which a white reference is unknown. As a result, the brightness of an original image can be corrected. Especially when not all image data can be stored in a memory in a system for processing a transmitted image signal, brightness estimation and brightness correction can be executed by applying the techniques to be described in the following third and fourth embodiments.

Figure 9:
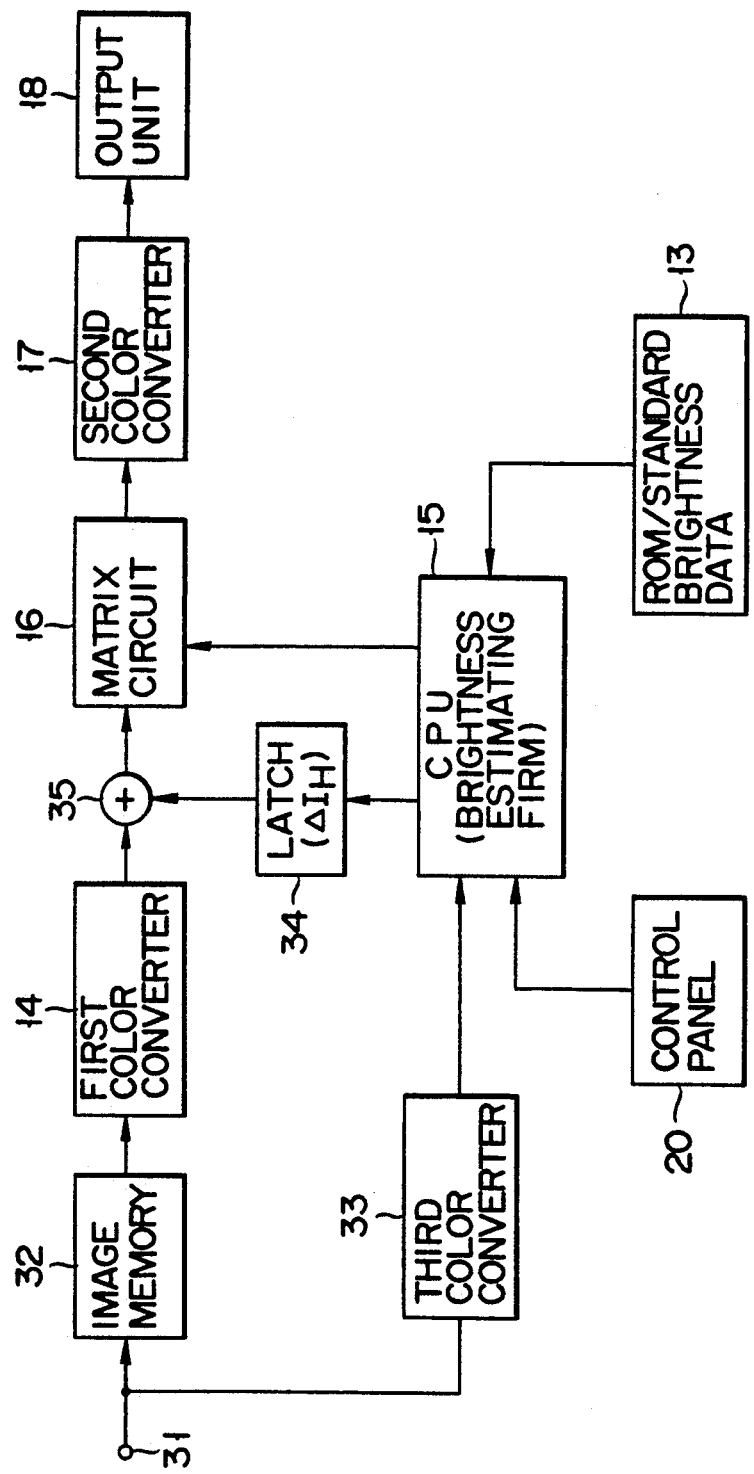

FIG. 9 is a block diagram showing the third embodiment of the present invention, in which data of a transmitted image signal is input to a terminal 31. This image data is temporarily stored in an image memory 32. This image memory 3 is a buffer memory having a capacity capable of storing image data having a comparatively significant image area and need not have a capacity of one screen (one frame). The input image data is also input to a third color converter 33 and subjected to logarithmic transformation represented by equation (1) by this color converter 33, and the logarithmically transformed image data is input to the CPU 15. The signal input to the CPU 15 is processed as in the first embodiment to execute brightness estimation.

In the brightness estimation system according to the present invention, the brightness of an image having only a specific color can be estimated as described above. Therefore, from only a part of an image, brightness estimation can be considerably correctly performed if several types of colors are present. That is, the brightness estimation operation is performed each time image data is input, the brightness correction value $\Delta I_H$ is supplied to a latch 34 when the image memory 32 is almost full with the image data, and an output from the latch 34 is added to an output from a first color converter 14 by an adder 35, thereby executing brightness correction as represented by equation (7). In addition, data is supplied to a matrix circuit 16 to execute contrast correction as in the first embodiment. In this manner, the brightness estimation and correction can be performed as in the first embodiment to reproduce a precise color image.

In this embodiment, since the brightness estimation can be performed using data of only a part of an image and information of an entire image is unnecessary, correct brightness estimation can be performed even when the capacity of the image memory 32 is smaller than a capacity of one frame. In addition, since the brightness estimation operation and the brightness correction operation can be simultaneously performed, the response characteristics can be improved.

FIG. 5 is a block diagram showing the fourth embodiment as a modification of the embodiment shown in FIG. 10. In this fourth embodiment, an image memory 32 is arranged after a first color converter 14 so that the color converter 14 can be used in both a brightness estimation operation and a brightness correction operation, thereby simplifying an apparatus.

Note that in each of the above embodiments, a color difference plane is divided into a plurality of blocks, and brightness information is obtained for each block. However, even when brightness information is obtained for only one block (local region), brightness estimation can be executed to some extent to achieve the prescribed object of the present invention.

In each of the above embodiments, after three primary color signals are subjected to logarithmic transformation, color differences are calculated to obtain color difference signals from which an influence of the brightness of an original image (the brightness of a light source) is removed. However, the information about the brightness of the light source can be removed by executing a ratio calculation (division) between the three primary color signals.

As has been described above, according to the present invention, while an influence of the brightness of a light source is removed, a luminance is compared with a standard luminance in each block on a plane such as a color difference plane, thereby stably estimating brightness information.

In addition, since this comparison is executed for a certain local region or each block and the brightness information is estimated on the basis of the comparison between a luminance and the standard luminance, correct brightness estimation can be executed even if an original image is constituted by deviated colors. That is, since a dark green color is compared with another green color, for example, a brightness difference derived from types of colors is eliminated to realize correct brightness information. In this case, by executing processing for averaging brightness information of each color difference using a frequency as a weight, the brightness estimation can be executed more stably.

By executing the brightness correction and the color correction using the estimated value of the brightness information obtained as described above, an output image having the same high reproducibility as obtained when an image is photographed or read at a proper brightness can be obtained.

Furthermore, since the brightness estimation can be performed by using only a part of an image, brightness information can be estimated from only a part of transmitted image data or image data of a file to execute brightness correction of the entire image. Therefore, an image memory having a large capacity need not be used, and high-speed processing can be performed.

What is claimed is:

1. A color image processing apparatus comprising:
    signal converting means for converting a color image signal into a first signal, influenced easily by brightness of an original image, and second and third signals, the second and third signals being influenced less easily by brightness of the original image,
    brightness estimating means including means for dividing a signal plane, defined by coordinate axes corresponding to the second and third signals, into a plurality of local regions, means for processing the first signal for each of the local region, to obtain a histogram about brightness for each of the local regions, means for comparing a level of the first signal appearing at a highest frequency in the histogram with a predetermined standard value to generate brightness information, and means for averaging the brightness information of each of the blocks using the highest frequency as a weight to obtain final brightness information; and
    brightness correcting means for correcting the color image signal in accordance with the final brightness information.

2. A color image processing apparatus comprising means for logarithmically transforming three primary color signals constituting a color image signal,
    means for converting the logarithmically transformed three primary color signals into a luminance signal and two color difference signals,
    brightness estimating means including means for dividing a color luminance plane, defined by coordinate axes corresponding to the two color difference signals, into a plurality of blocks to obtain a histogram about a luminance for each of the blocks, means for comparing a luminance appearing at the highest frequency in the histogram with a predetermined standard luminance to generate brightness information about the color image signal, and means for averaging the brightness information of each of the blocks using the highest frequency as a weight to obtain final brightness information; and brightness correcting means for correcting the color image signal in accordance with the final brightness information.

3. A color image processing apparatus according to claim 2, wherein said brightness correcting means subjects correction processing according to the final brightness information obtained by said brightness estimating means, to the logarithmically transformed three primary color signals.

4. A color image processing apparatus according to claim 2, wherein said means for logarithmically transforming comprises a color converter for logarithmically transforming the color image signal in accordance with the following equation:

$$Di = -\log[(Si/Sbi) + \alpha]$$

where Si is the color image signal, Sbi a signal value corresponding to a film base, Di a logarithmically transformed color signal and $\alpha$ is a logarithmic transformation result of a value to prevent Di from becoming infinite.

5. A color image processing apparatus according to claim 2, wherein said signal converting means comprises means for calculating the luminance and two color differences from the transformed color signal in accordance with the following equations:

$$I = (D_R + D_G + D_B)/3$$

$$C1 = D_R - D_G$$

$$C2 = D_G - D_B$$

where I is the luminance, C1 and C2 are the two color differences, $D_R$, $D_G$, and $D_B$ red, green and blue color signal levels.

6. A color image processing apparatus according to claim 2, wherein said signal converting means comprises means for calculating the luminance and two color differences from the transformed color signal in accordance with the following equations:

$$I = \frac{(i_1 D_R + i_2 D_G + i_3 D_B)}{(i_1 + i_2 + i_3)}$$

$$C1 = a_1 D_R - a_2 D_G$$

$$C2 = b_1 D_G - b_2 D_B$$

where $i_1$, $i_2$, and $i_3$ are coefficients for matching the luminance I with a visual sensitivity, and $a_1$, $a_2$, $b_1$, and $b_2$ coefficients used for causing an achromatic color axis to coincide with axes of the color differences $C_1$ and $C_2$.

7. A color image processing apparatus according to claim 2, wherein said means for logarithmically transforming includes a RAM table and a matrix circuit having masking matrix coefficients which are switched in accordance with a negative film or a positive film from which the color image signal is picked up by a color image sensor.

* * * * *

UNITED STATES PATENT AND TRADEMARK OFFICE
CERTIFICATE OF CORRECTION

PATENT NO. : 5,278,641
DATED : January 11, 1994
INVENTOR(S) : Hidekazu Sekizawa et al.

It is certified that error appears in the above-indentified patent and that said Letters Patent is hereby corrected as shown below:

On the Title Page:
Attorney, Agent, or Firm, line 1,
after "Henderson" insert --,--.

Claim 1, column 10, line 48, change "region"
to ---regions--.

Signed and Sealed this

Thirteenth Day of September, 1994

Attest:

BRUCE LEHMAN

Attesting Officer

Commissioner of Patents and Trademarks